US010873847B2

(12) United States Patent
Lee et al.

(10) Patent No.: US 10,873,847 B2
(45) Date of Patent: Dec. 22, 2020

(54) METHOD AND HOST DEVICE FOR COMMUNICATING AMONG MULTIPLE DEVICES

(71) Applicant: Samsung Electronics Co., Ltd., Suwon-si (KR)

(72) Inventors: Jae-keun Lee, Seoul (KR); Ji-hwan Seo, Suwon-si (KR); Min-ho Lee, Gwacheon-si (KR); Myeong-gi Jeong, Incheon (KR); Chi-hyun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 14/953,813

(22) Filed: Nov. 30, 2015

(65) Prior Publication Data

US 2016/0157087 A1     Jun. 2, 2016

(30) Foreign Application Priority Data

Dec. 2, 2014  (KR) .......................... 10-2014-0170819

(51) Int. Cl.
| | |
|---|---|
| *H04W 8/12* | (2009.01) |
| *H04W 8/00* | (2009.01) |
| *H04W 4/08* | (2009.01) |
| *H04W 12/08* | (2009.01) |
| *H04W 40/02* | (2009.01) |
| *H04W 4/80* | (2018.01) |

(52) U.S. Cl.
CPC .............. *H04W 8/12* (2013.01); *H04W 4/08* (2013.01); *H04W 4/80* (2018.02); *H04W 8/005* (2013.01); *H04W 12/08* (2013.01); *H04W 40/02* (2013.01)

(58) Field of Classification Search
CPC ................................. H04W 8/12; H04W 4/08
USPC ........................................................ 370/329
See application file for complete search history.

(56) References Cited

U.S. PATENT DOCUMENTS

| | | | |
|---|---|---|---|
| 8,625,481 | B2 | 1/2014 | Duggi et al. |
| 2005/0169238 | A1 | 8/2005 | Yang et al. |

(Continued)

FOREIGN PATENT DOCUMENTS

| | | |
|---|---|---|
| JP | 2010-045525 A | 2/2010 |
| KR | 10-2008-0108024 A | 12/2008 |

(Continued)

OTHER PUBLICATIONS

Ververidis et al, "Service Discovery for Mobile Ad Hoc Networks: A Survey of Issues and Techniques", IEEE Communications Surveys & Tutorials, XP011234560, 3rd Quarter 2008, vol. 10, No. 3.

*Primary Examiner* — Samina F Choudhry
(74) *Attorney, Agent, or Firm* — Jefferson IP Law, LLP

(57) ABSTRACT

A host device and a method of communicating with a plurality of devices are provided. The method includes operations of searching for devices that are communicatable with the host device, generating routing paths connected to a wearable device via devices found by the host device, selecting one of the routing paths according to a preset reference, and communicating with the wearable device via at least one of the found devices included in the selected routing path, wherein the preset reference includes a first reference that is set according to a service executed by the host service, or includes a second reference that is set according to a security level of each of the found devices.

13 Claims, 19 Drawing Sheets

(56) References Cited

U.S. PATENT DOCUMENTS

| | | | |
|---|---|---|---|
| 2006/0268823 A1* | 11/2006 | Kim | H04W 72/005 |
| | | | 370/349 |
| 2009/0007246 A1* | 1/2009 | Gutowski | H04L 63/20 |
| | | | 726/6 |
| 2010/0278102 A1 | 11/2010 | Lee et al. | |
| 2011/0145417 A1 | 6/2011 | Tamura | |
| 2013/0232559 A1 | 9/2013 | Bello et al. | |
| 2014/0025796 A1* | 1/2014 | Vibhor | H04L 67/1097 |
| | | | 709/222 |
| 2014/0244785 A1* | 8/2014 | Potlapally | H04L 67/10 |
| | | | 709/217 |
| 2014/0314096 A1 | 10/2014 | Hui et al. | |
| 2015/0227890 A1* | 8/2015 | Bednarek | G06Q 10/08355 |
| | | | 705/26.81 |

FOREIGN PATENT DOCUMENTS

| | | |
|---|---|---|
| WO | 2011/083389 A1 | 7/2011 |
| WO | 2014/143776 A2 | 9/2014 |

\* cited by examiner

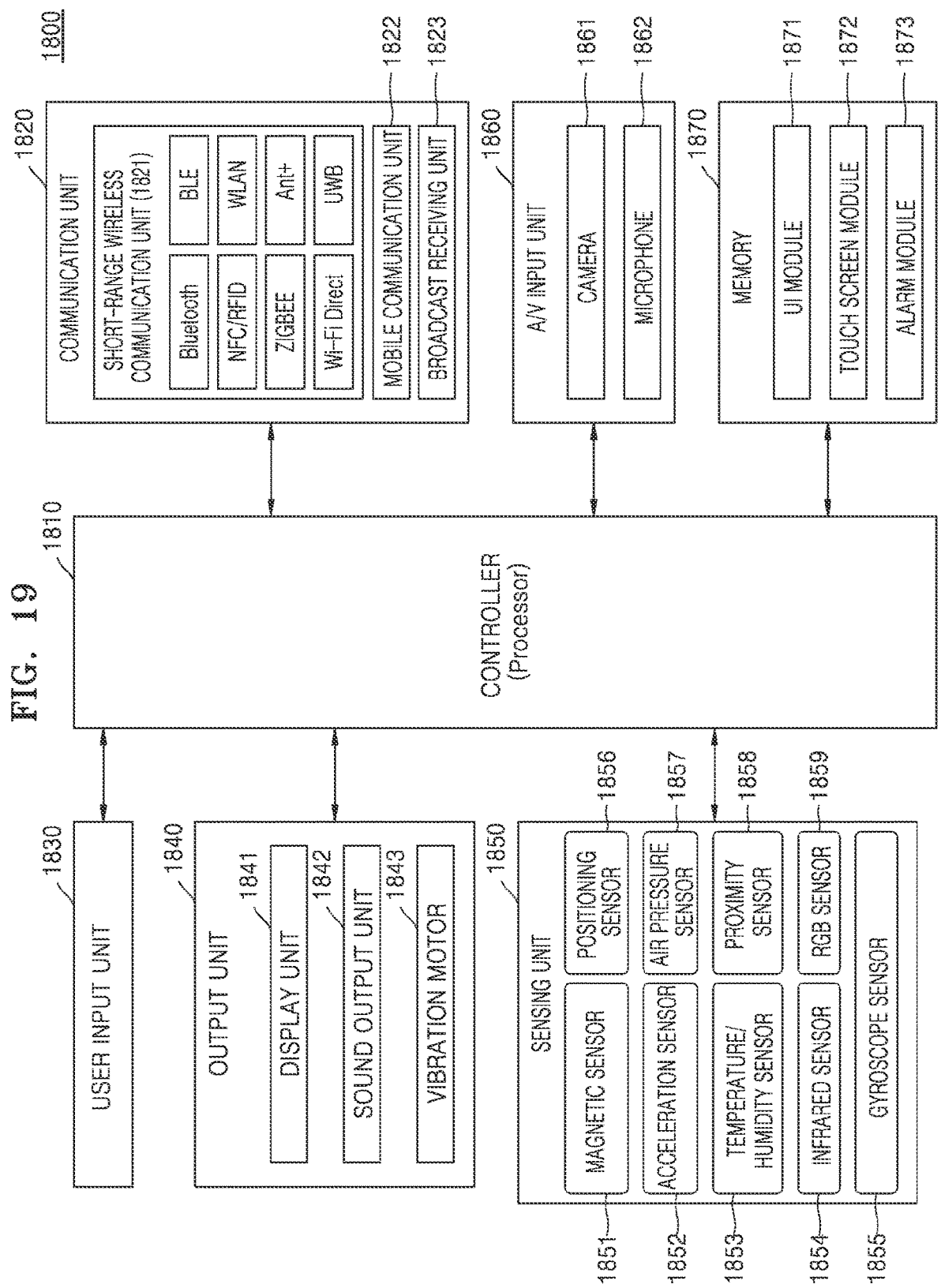

METHOD AND HOST DEVICE FOR COMMUNICATING AMONG MULTIPLE DEVICES

CROSS-REFERENCE TO RELATED APPLICATION(S)

This application claims the benefit under 35 U.S.C. § 119(a) of a Korean patent application filed on Dec. 2, 2014 in the Korean Intellectual Property Office and assigned Serial number 10-2014-0170819, the entire disclosure of which is hereby incorporated by reference.

TECHNICAL FIELD

The present disclosure relates to a method and host device for communicating among a plurality of devices.

BACKGROUND

A communication technology such as Bluetooth or ZigBee allows devices to be connected to each other without a medium therebetween. However, Bluetooth or ZigBee only supports 1:1 communication. Personal computers (PCs), smartphones, refrigerators, lamps, air-conditioners, or televisions (TVs) support Bluetooth or ZigBee. Network routing aims to find a best path from a source to a destination. Routing allows connection to a device that is not physically connected in an internet protocol (IP) network where many devices are connected. However, since a communication technology such as Bluetooth or ZigBee does not support many-to-many connection, routing is not possible for such a communication technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and host device for communicating among a plurality of devices.

Another aspect of the present disclosure is to provide a non-transitory computer-readable recording medium having recorded thereon a program for executing the method, by using a computer.

Additional aspects will be set forth in part in the description which follows and, in part, will be apparent from the description, or may be learned by practice of the presented embodiments.

In accordance with an aspect of the present disclosure, a method of communicating with a plurality of devices is provided. The method performed by a host device includes searching for devices that are communicatable with the host device, generating routing paths connected to a wearable device via devices found by the host device, selecting one of the routing paths according to a preset reference, and communicating with the wearable device via at least one of the found devices included in the selected routing path, wherein the preset reference includes a first reference that is set according to a service executed by the host service, or includes a second reference that is set according to a security level of each of the found devices.

The method may further include grouping the found devices according to a preset grouping reference, the selecting may include generating routing paths connected to the wearable device via the grouped devices, and selecting one of the routing paths according to a preset reference, and the preset grouping reference may include at least one of a grouping reference according to services to be executed by the host service, a grouping reference according to distances between the host device and the found devices, and a grouping reference according to users of the found devices.

The searching may include searching for the devices according to a communication history between the host device and the devices, or may include searching for the devices according to a device list received from a home server.

The method may further include transmitting, to the wearable device, information related to the service executed by the host service.

The transmitting may include transmitting information for allowing the at least one of the found devices to execute a service that is executable by the at least one of the found devices in the selected routing path.

The preset reference may include a third reference that is set according to a location of the host device.

The preset reference may include a fourth reference that is set according to access authorities with respect to the found devices.

In accordance with another aspect of the present disclosure, a host device that transmits information to at least one device included in a routing path is provided. The host device includes a controller configured to search for devices that are communicatable with the host device, to generate routing paths connected to a wearable device via devices found by the host device, and to select one of the routing paths according to a preset reference, and a communication unit configured to transmit information to the wearable device via at least one of the found devices included in the selected routing path, wherein the preset reference includes a first reference that is set according to a service executed by the host service, or includes a second reference that is set according to a security level of each of the found devices.

The controller may be further configured to group the found devices according to a preset grouping reference, to generate routing paths connected to the wearable device via the grouped devices, and to select one of the routing paths according to a preset reference, and the preset grouping reference may include at least one of a grouping reference according to services to be executed by the host service, a grouping reference according to distances between the host device and the found devices, and a grouping reference according to users of the found devices.

The controller may be further configured to search for the devices according to a communication history between the host device and the devices, or may be further configured to search for the devices according to a device list received from a home server.

The communication unit may be further configured to transmit, to the wearable device, information related to the service executed by the host service.

The communication unit may be further configured to transmit information for allowing the at least one of the found devices to execute a service that is executable by the at least one of the found devices in the selected routing path.

The preset reference may include a third reference that is set according to a location of the host device.

The preset reference may include a fourth reference that is set according to access authorities with respect to the found devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18 and 19 are block diagrams illustrating devices for communicating among a plurality of devices according to various embodiments of the present disclosure.

Throughout the drawings, it should be noted that like reference numbers are used to depict the same or similar elements, features, and structures.

DETAILED DESCRIPTION

Figure 1:
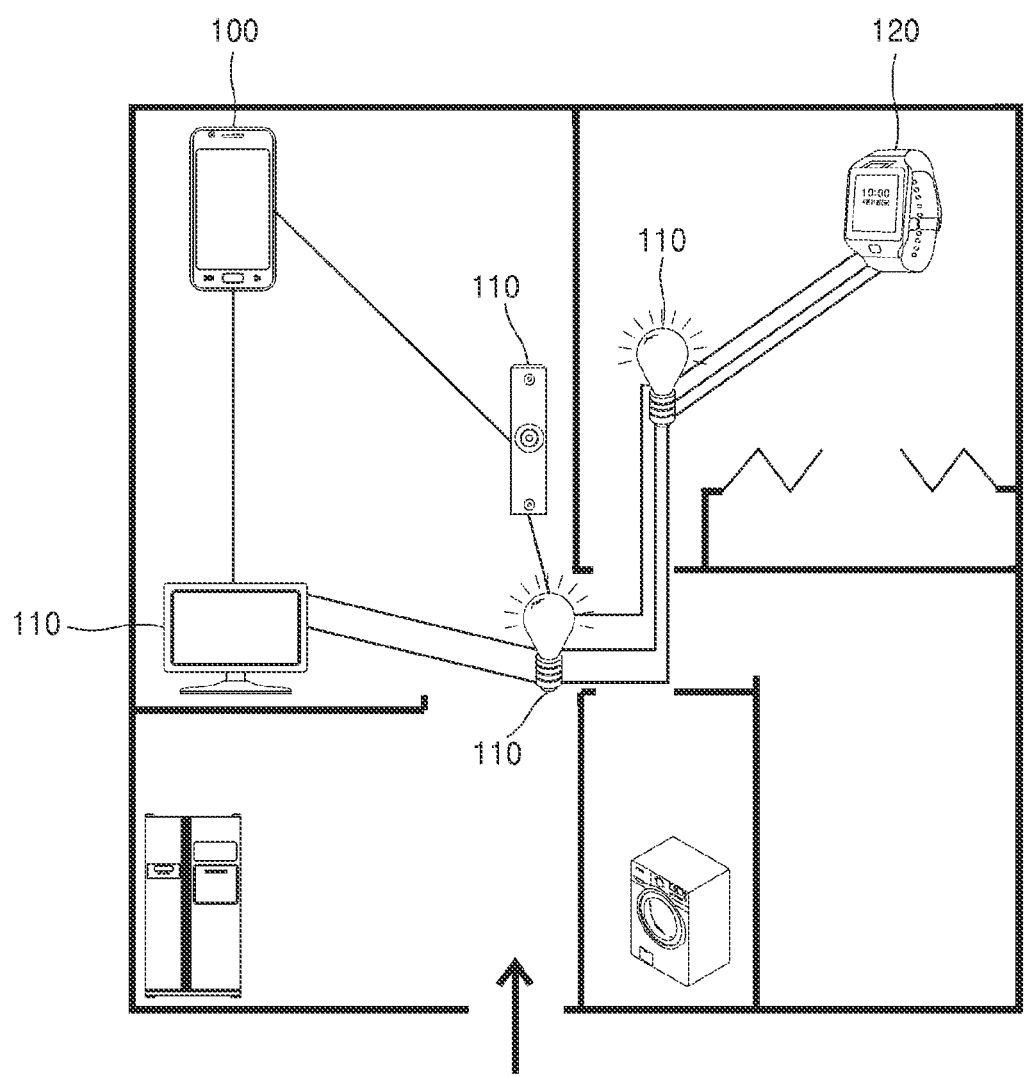
FIG. 1 is a conceptual diagram illustrating communication among a plurality of devices according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, terms that are used in the specification will be briefly described, and the inventive concept will be described below.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the inventive concept. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. The term 'unit' in the various embodiments means a software component or hardware components such as a field-programmable gate array (FPGA) or an application-specific integrated circuit (ASIC), and performs a specific function. However, the term 'unit' is not limited to software or hardware. The 'unit' may be formed so as to be in an addressable storage medium, or may be formed so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

Hereinafter, the various embodiments will be described with reference to the attached drawings so as to fully convey the concept of the various embodiments to one of ordinary skill in the art. In the following description, well-known functions or constructions are not described since they would obscure the inventive concept with unnecessary detail.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

Throughout the specification, the term "grouping" indicates classifying devices into a plurality of groups.

Hereinafter, the various embodiments will be described with reference to the attached drawings.

As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual diagram illustrating communication among a plurality of devices according to an embodiment of the present disclosure.

Referring to FIG. 1, a host device 100 may communicate with a wearable device 120 via a device 110 that is communicatable with the host device 100. For example, the host device 100 may include a smart device such as a smartphone, or the like. The device 110 that is communicatable with the host device 100 may include a smart television (TV), a smart air-conditioner, a telephone, a smart refrigerator, a smart washing machine, or the like. The wearable device 120 may include a smart watch, smart glasses, or the like.

Figure 2:
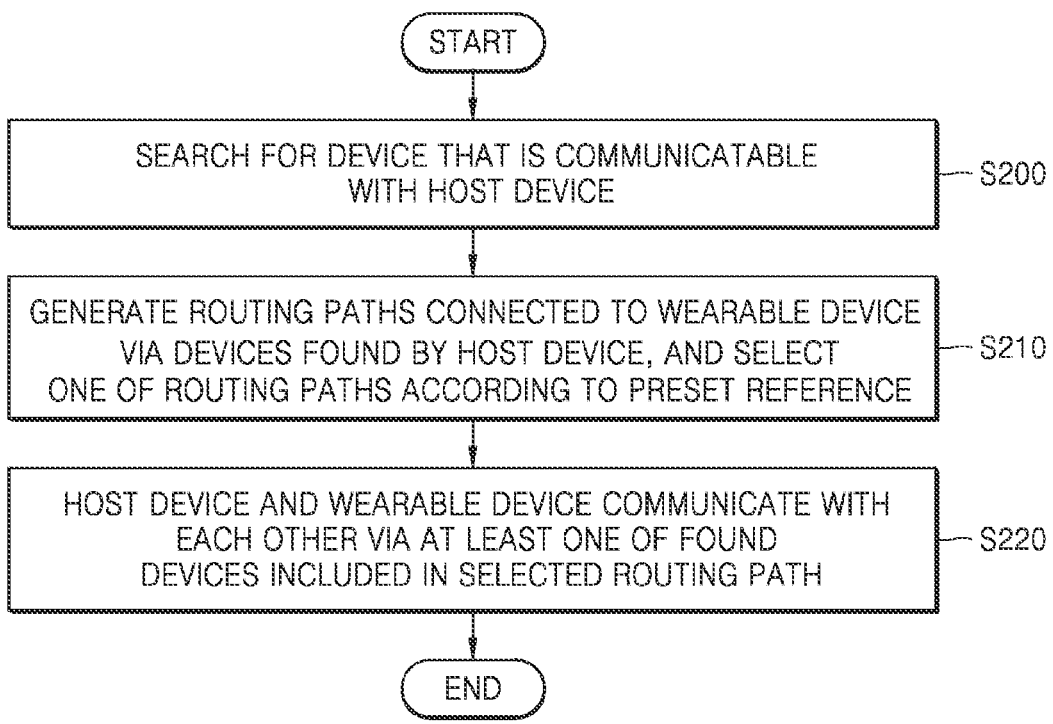
FIG. 2 is a flowchart of a communication method performed among a plurality of devices according to an embodiment of the present disclosure.

FIG. 2 is a flowchart of a communication method performed among a plurality of devices according to an embodiment of the present disclosure.

Referring to FIG. 2, in operation S200, the host device 100 may search for a device 110 that is communicatable with the host device 100.

In operation S210, the host device 100 may generate routing paths that are connected to the wearable device 120 via devices 110 found by the host device 100, and may select one of the routing paths according to a preset reference.

In operation S220, the host device 100 and the wearable device 120 may communicate with each other via at least one of the found devices 110 included in the selected routing path.

Figure 3:
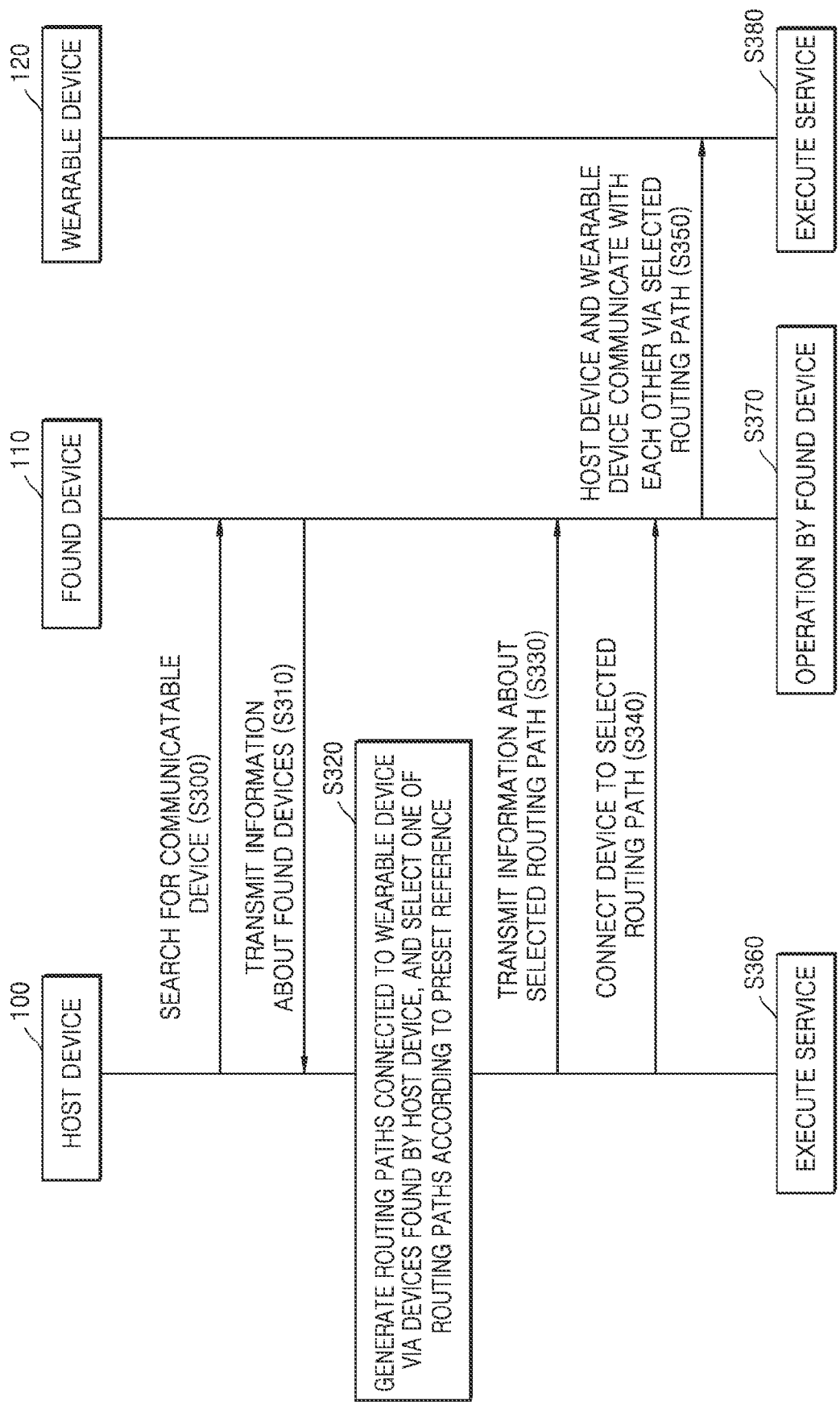
FIG. 3 is a flowchart of a communication method performed among a plurality of devices according to an embodiment of the present disclosure.

FIG. 3 is a flowchart of a communication method performed among a plurality of devices according to an embodiment of the present disclosure.

Referring to FIG. 3, in operation S300, the host device 100 may search for a device 110 that is communicatable with the host device 100. The host device 100 may search for the device 110, based on a previous communication history. Alternatively, the host device 100 may receive a device list from a home server (a gateway), and may search for the device 110, based on the received information. Alternatively, the host device 100 may periodically search for devices 110. Therefore, if the host device 100 is moved to another place and thus is disconnected from devices that were connected to the host device 100, the host device 100 may search for other devices and may be connected to one of other found devices.

In operation S310, one or more found devices 110 may transmit information about the found devices 110 to the host device 100.

In operation S320, the host device 100 may generate routing paths connected to the wearable device 120 via the found devices 110, and may select one of the routing paths according to a preset reference.

In operation S330, the host device 100 may transmit information about the selected routing path to the found devices 110.

In operation S340, the host device 100 may be connected to at least one of the found devices 110 in the selected routing path.

In operation S350, the host device 100 and the wearable device 120 may communicate with each other via the selected routing path.

In operation S360, the host device 100 may execute a service. Here, the service may include an application that is executable by the host device 100.

In operation S370, the found device 110 may operate. In this regard, the host device 100 may transmit information for an operation of at least one of the found devices 110 to the found device 110.

In operation S380, the wearable device 120 may execute a service. Here, the service may include an application that is executed by the host device 100. The service may also include an application that is executable by the wearable device 120.

FIGS. 4 to 15 are flowcharts of communication methods performed among a plurality of devices according to various embodiments of the present disclosure.

Figure 4:
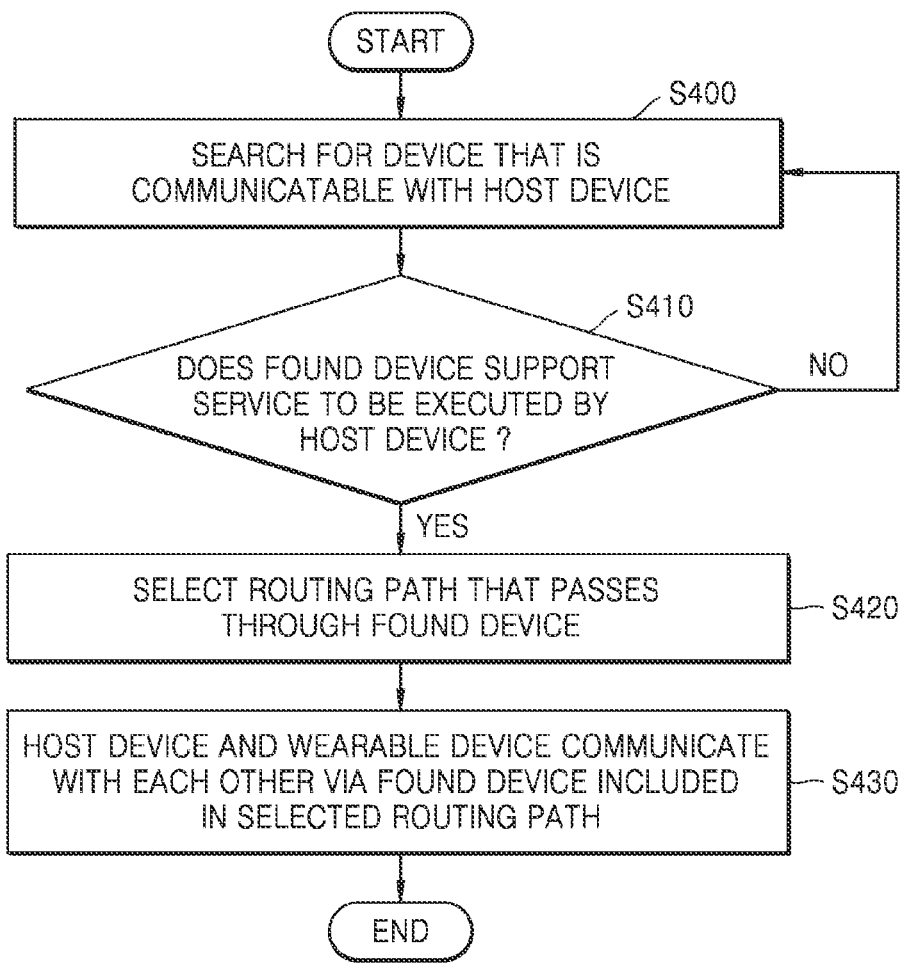
FIGS. 4 to 15 are flowcharts of communication methods performed among a plurality of devices according to various embodiments of the present disclosure.

Referring to FIG. 4, in operation S400 of FIG. 4, the host device 100 searches for a device 110 that is communicatable with the host device 100.

In operation S410, if a found device 110 supports a service to be executed by the host device 100, in operation S420, the host device 100 selects a routing path that passes through the found device 110. In operation S410, if the found device 110 does not support the service to be executed by the host device 100, the host device 100 returns to operation S400 and searches for a device 110 that is communicatable with the host device 100.

In operation S430, the host device 100 and the wearable device 120 communicate with each other via the selected routing path.

Figure 5:
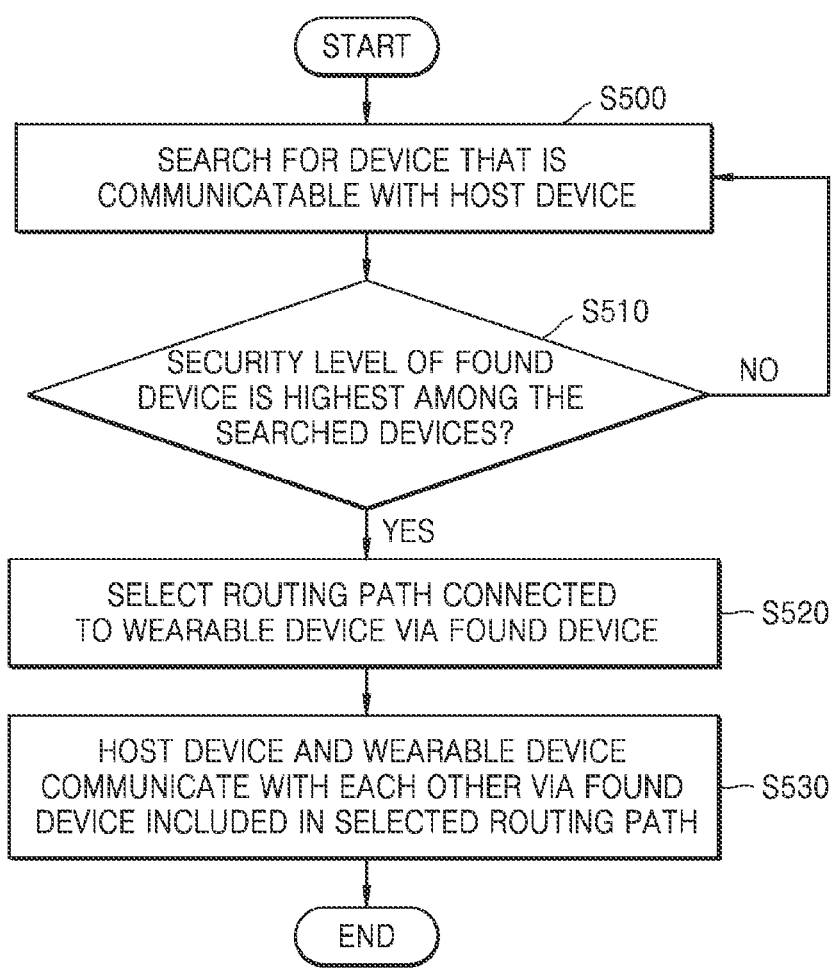

Referring to FIG. 5, in operation S500 of FIG. 5, the host device 100 searches for a device 110 that is communicatable with the host device 100.

In operation S510, if a security level of a found device 110 is not highest among the searched devices, the host device 100 returns to operation S500 and searches for a device 110 that is communicatable with the host device 100. In operation S510, if the security level of the found device 110 is highest among the searched devices, in operation S520, the host device 100 selects a routing path that is connected to the wearable device 120 via the found device 110.

In operation S530, the host device 100 and the wearable device 120 communicate with each other via the found device 110 included in the selected routing path.

Figure 6:
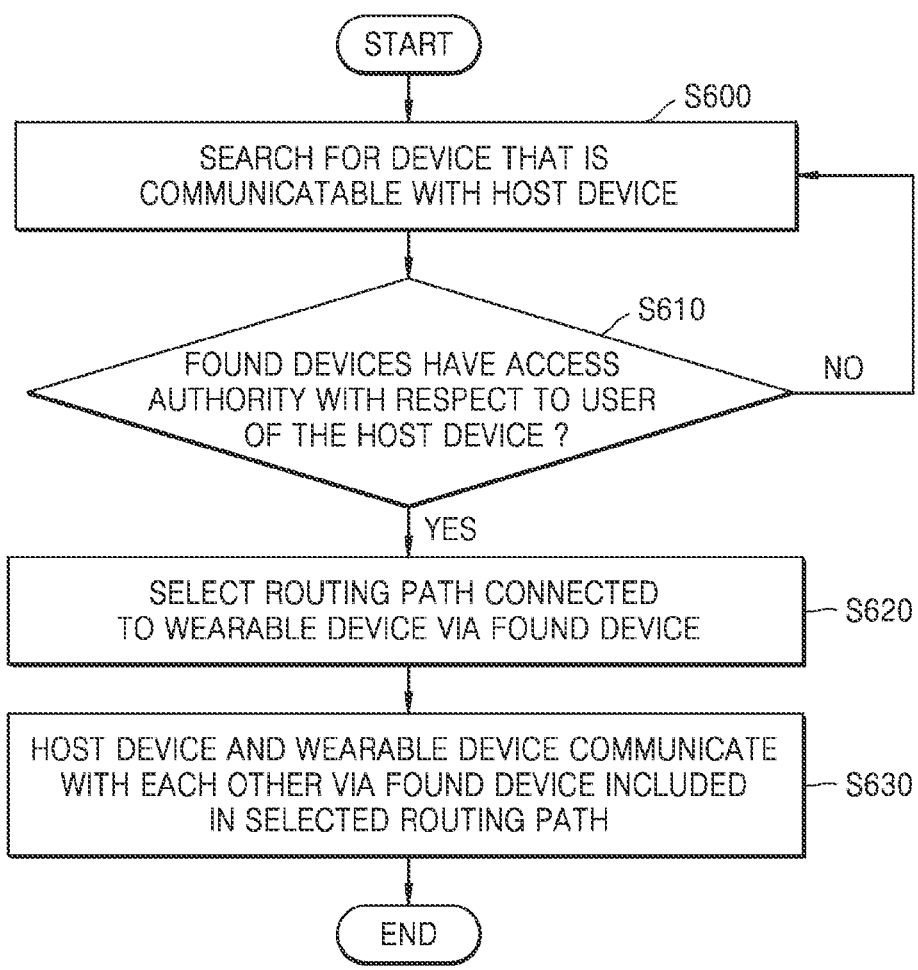

Referring to FIG. 6, in operation S600 of FIG. 6, the host device 100 searches for a device 110 that is communicatable with the host device 100.

In operation S610, if found devices 110 do not have access authority with respect to a user of the host device 100, the host device 100 returns to operation S600 and searches for a device 110 that is communicatable with the host device 100. In operation S610, if the found devices 110 have the access authority with respect to the user of the host device 100, in operation S620, the host device 100 selects a routing path that is connected to the wearable device 120 via at least one of the found devices 110.

In operation S630, the host device 100 and the wearable device 120 communicate with each other via at least one of the found devices 110 included in the selected routing path.

Figure 7:
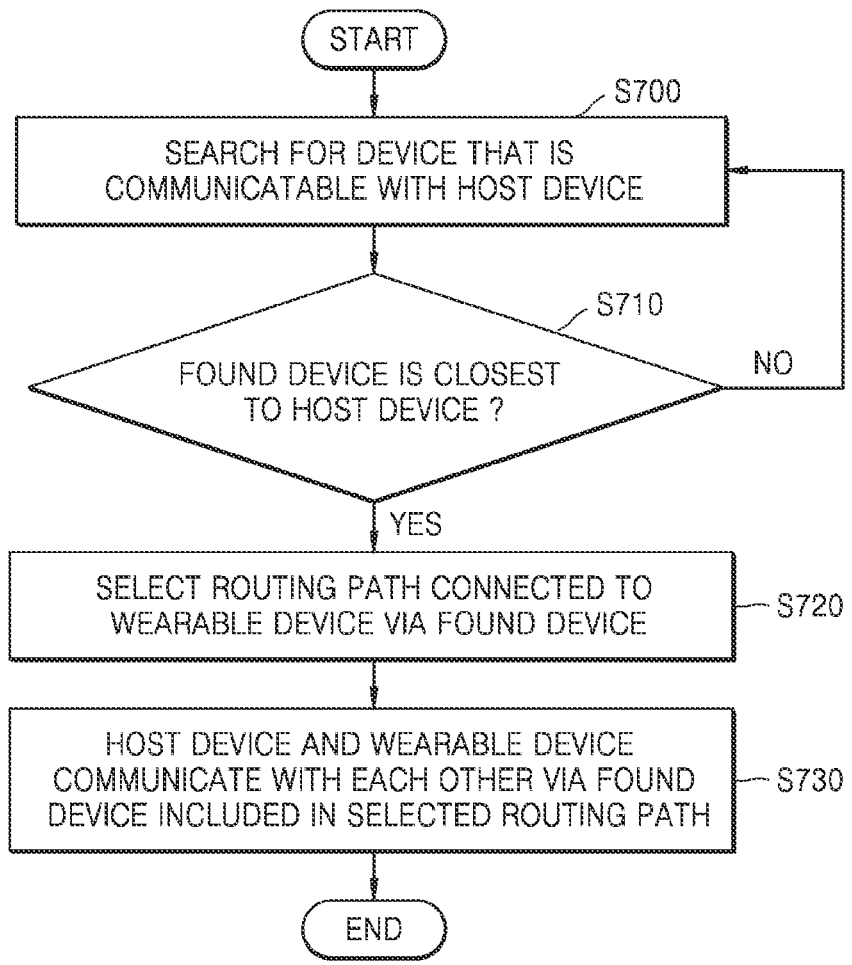

Referring to FIG. 7, in operation S700 of FIG. 7, the host device 100 searches for a device 110 that is communicatable with the host device 100.

In operation S710, if a found device 110 is not closest to the host device 100, the host device 100 returns to operation S700 and searches for a device 110 that is communicatable with the host device 100. In operation S710, if the found device 110 is closest to the host device 100, in operation S720, the host device 100 selects a routing path that is connected to the wearable device 120 via the found device 110.

In operation S730, the host device 100 and the wearable device 120 communicate with each other via the found device 110 included in the selected routing path.

Figure 8:
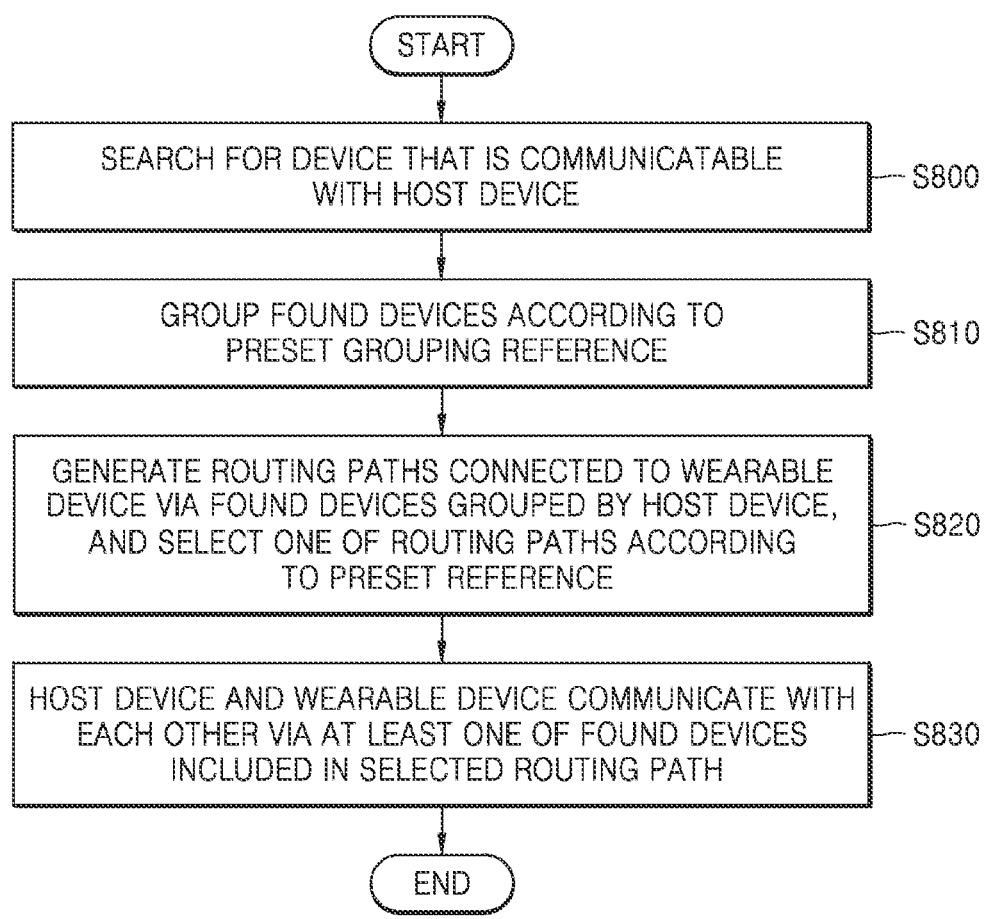

Referring to FIG. 8, in operation S800 of FIG. 8, the host device 100 searches for a device 110 that is communicatable with the host device 100.

In operation S810, the host device 100 groups found devices 110 according to a preset grouping reference. The grouping reference may involve grouping the found devices 110, according to services that are provided by the found devices 110 including a video device, an audio device, a lighting system, or the like. Alternatively, the grouping reference may involve grouping the found devices 110 by taking into account factors such as battery capacities, communication connection capabilities, etc. of the found devices 110. Here, the term "grouping" indicates grouping the found devices 110 into a plurality of groups. For example, when the found devices 110 include a telephone, a lighting apparatus, a refrigerator, and a TV, the host device 100 may group the telephone and the lighting apparatus into a first group, and may group the refrigerator and the TV into a second group. For example, the host device 100 may set a routing path only via a device of the first group or only via a device of the second group. As another example, the host device 100 may group the found devices 110 into a group of devices having a high remaining battery capacity and another group of devices having a low remaining battery capacity. Alternatively, the host device 100 may group the found devices 110 into a group of devices having an excellent communication connection capability and another group of devices having a lower communication connection capability. As another example, the host device 100 may group the found devices 110 according to distances between the host device 100 and the found devices 110. The host device 100 may group the found devices 110 into a group of devices located within a preset distance range (e.g., 5m), and another group of devices located outside the preset distance range (e.g., 5m). The grouping reference may be variously set according to users. For example, in a case where a user groups the devices 110 according to performance of the found devices 110, and another user groups the devices 110 according to services provided by the devices 110, the grouping reference may be variously set according to the users who use the host device 100.

In operation S820, the host device 100 generates routing paths that are connected to the wearable device 120 via the found devices 110 grouped by the host device 100, and selects one of the routing paths according to a preset reference.

In operation S830, the host device 100 and the wearable device 120 communicate with each other via at least one of the found devices 110 included in the selected routing path.

Figure 9:
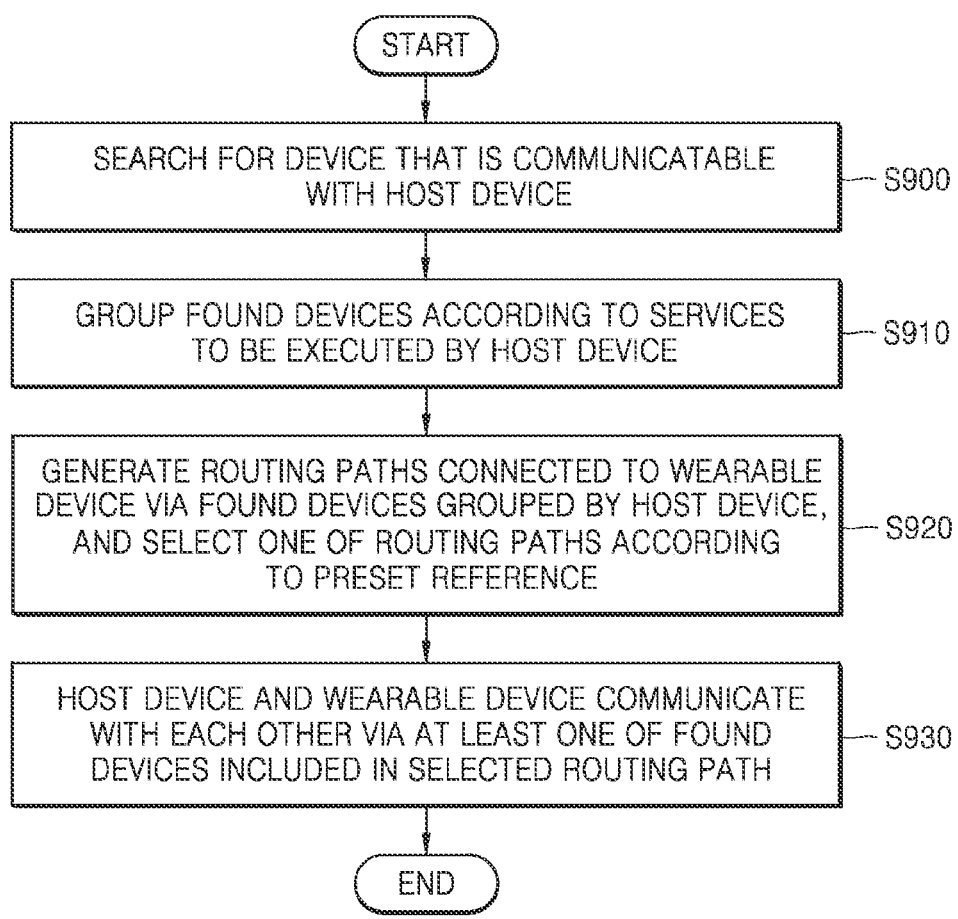

Referring to FIG. 9, in operation S900 of FIG. 9, the host device 100 searches for a device 110 that is communicatable with the host device 100.

In operation S910, the host device 100 groups found devices 110 according to services to be executed by the host device 100. In operation S920, the host device 100 generates routing paths that are connected to the wearable device 120 via the found devices 110 grouped by the host device 100, and selects one of the routing paths according to a preset reference.

In operation S930, the host device 100 and the wearable device 120 communicate with each other via at least one of the found devices 110 included in the selected routing path.

Figure 10:
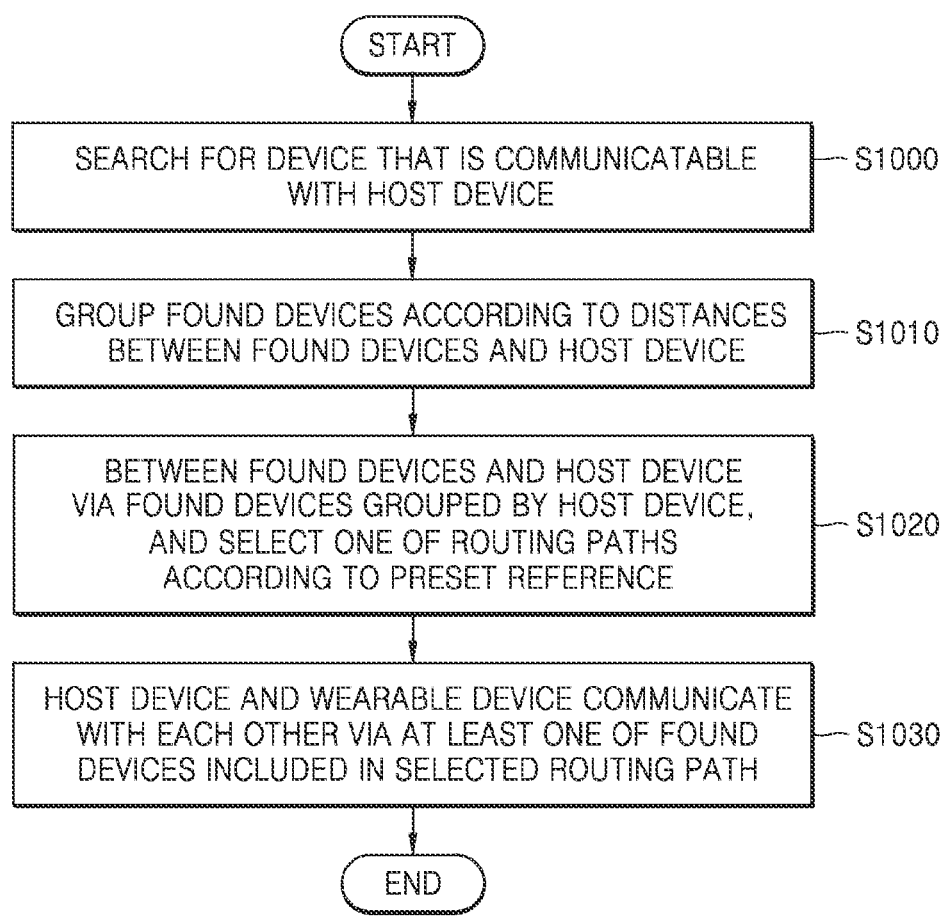

Referring to FIG. 10, in operation S1000 of FIG. 10, the host device 100 searches for a device 110 that is communicatable with the host device 100.

In operation S1010, the host device 100 may group found devices 110 according to distances between the found devices 110 and the host device 100.

In operation S1020, the host device 100 generates routing paths that are connected to the wearable device 120 via the found devices 110 grouped by the host device 100, and selects one of the routing paths according to a preset reference.

In operation S1030, the host device 100 and the wearable device 120 communicate with each other via at least one of the found devices 110 included in the selected routing path.

Figure 11:
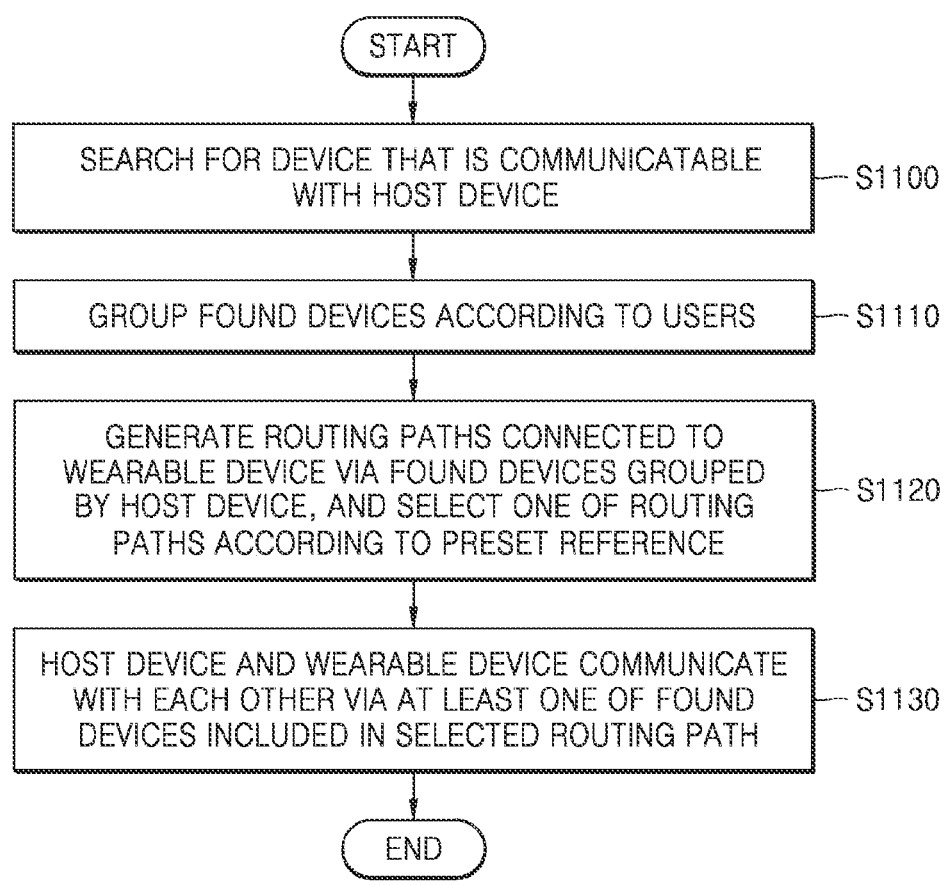

Referring to FIG. 11, in operation S1100 of FIG. 11, the host device 100 searches for a device 110 that is communicatable with the host device 100.

In operation S1110, the host device 100 groups found devices 110 according to users.

In operation S1120, the host device 100 sets a routing path according to a preset reference so as to communicate with the wearable device 120 via at least one of the grouped devices 110.

In operation S1130, the host device 100 and the wearable device 120 communicate with each other via at least one of the grouped devices 110 included in the selected routing path.

Figure 12:
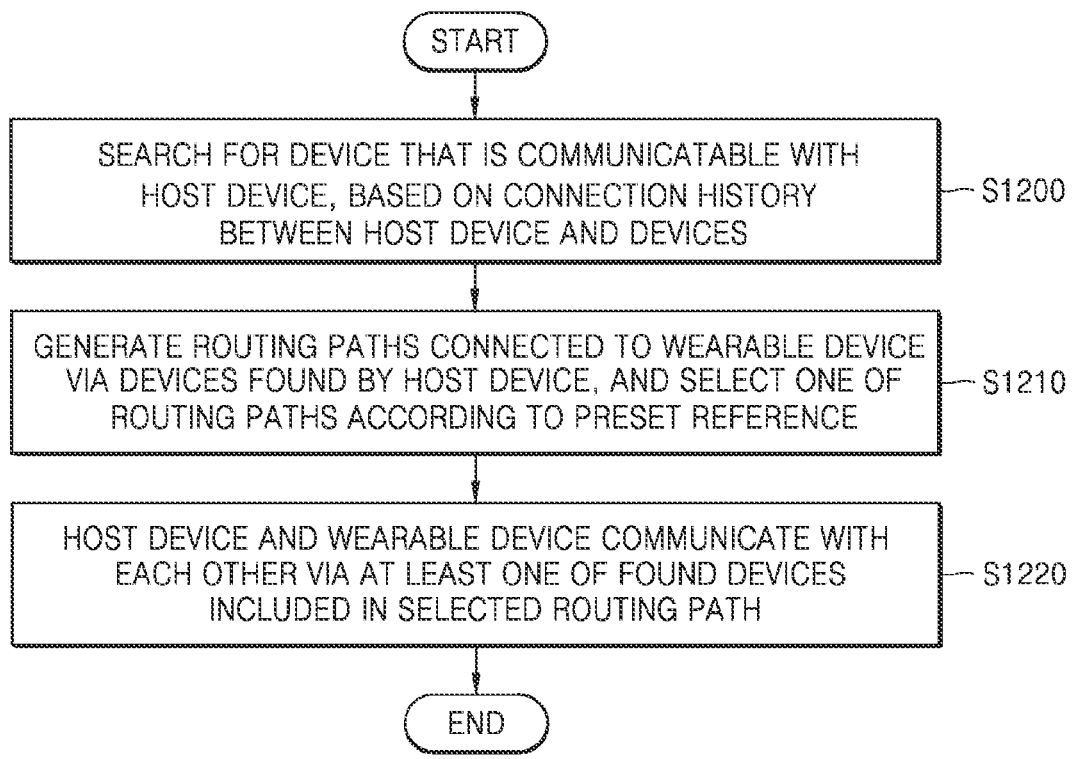

Referring to FIG. 12, in operation S1200 of FIG. 12, the host device 100 searches for a device 110 that is communicatable with the host device 100, based on a connection history between the host device 100 and devices.

In operation S1210, the host device 100 generates routing paths that are connected to the wearable device 120 via devices 110 found by the host device 100, and selects one of the routing paths according to a preset reference.

In operation S1220, the host device 100 and the wearable device 120 communicate with each other via at least one of the found devices 110 included in the selected routing path.

Figure 13:
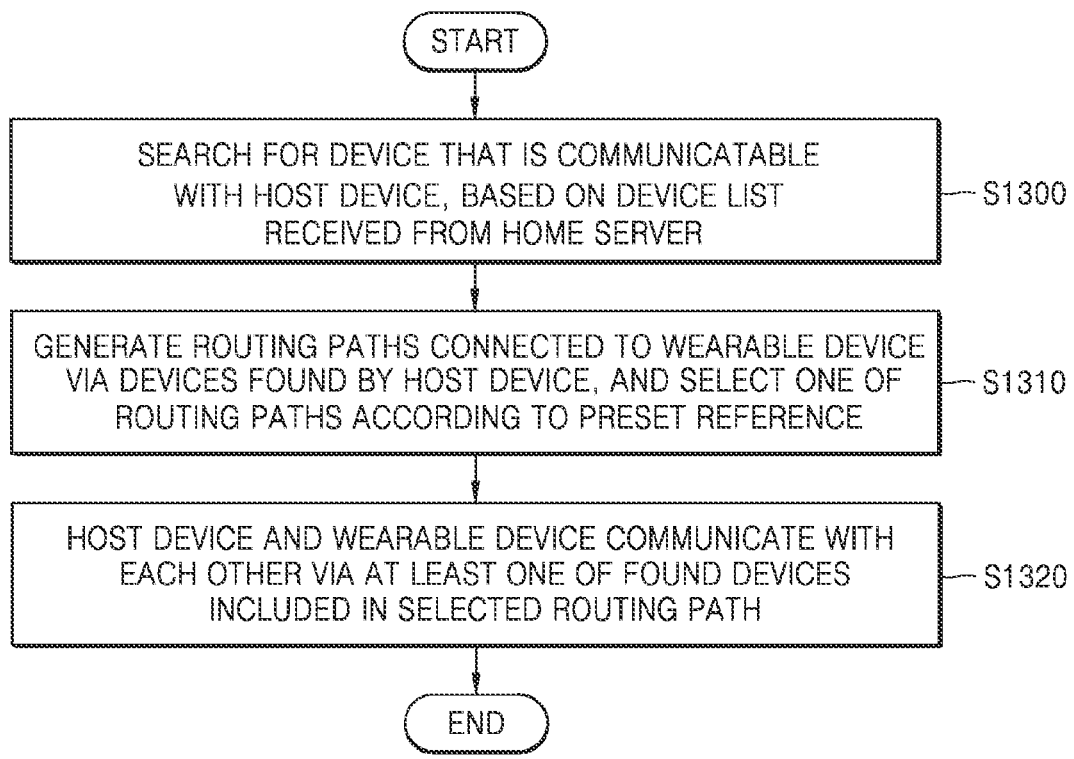

Referring to FIG. 13, in operation S1300 of FIG. 13, the host device 100 searches for a device 110 that is communicatable with the host device 100, based on a device list received from a home server.

In operation S1310, the host device 100 generates routing paths that are connected to the wearable device 120 via devices 110 found by the host device 100, and selects one of the routing paths according to a preset reference.

In operation S1320, the host device 100 and the wearable device 120 communicate with each other via at least one of the found devices 110 included in the selected routing path.

Figure 14:
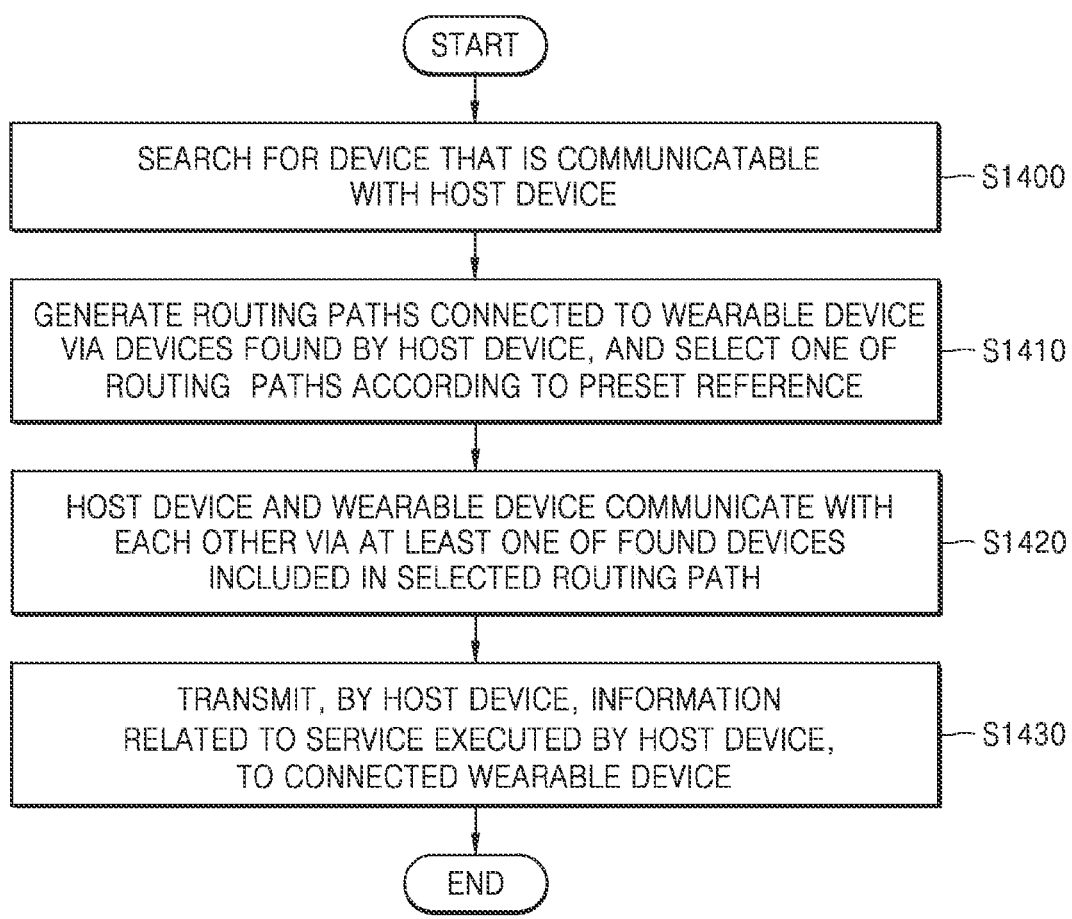

Referring to FIG. 14, in operation S1400 of FIG. 14, the host device 100 searches for a device 110 that is communicatable with the host device 100.

In operation S1410, the host device 100 generates routing paths that are connected to the wearable device 120 via devices 110 found by the host device 100, and selects one of the routing paths according to a preset reference.

In operation S1420, the host device 100 and the wearable device 120 communicate with each other via at least one of the found devices 110 included in the selected routing path.

In operation S1430, the host device 100 transmits, to the wearable device 120, information related to a service that is executed by the host device 100.

Figure 15:
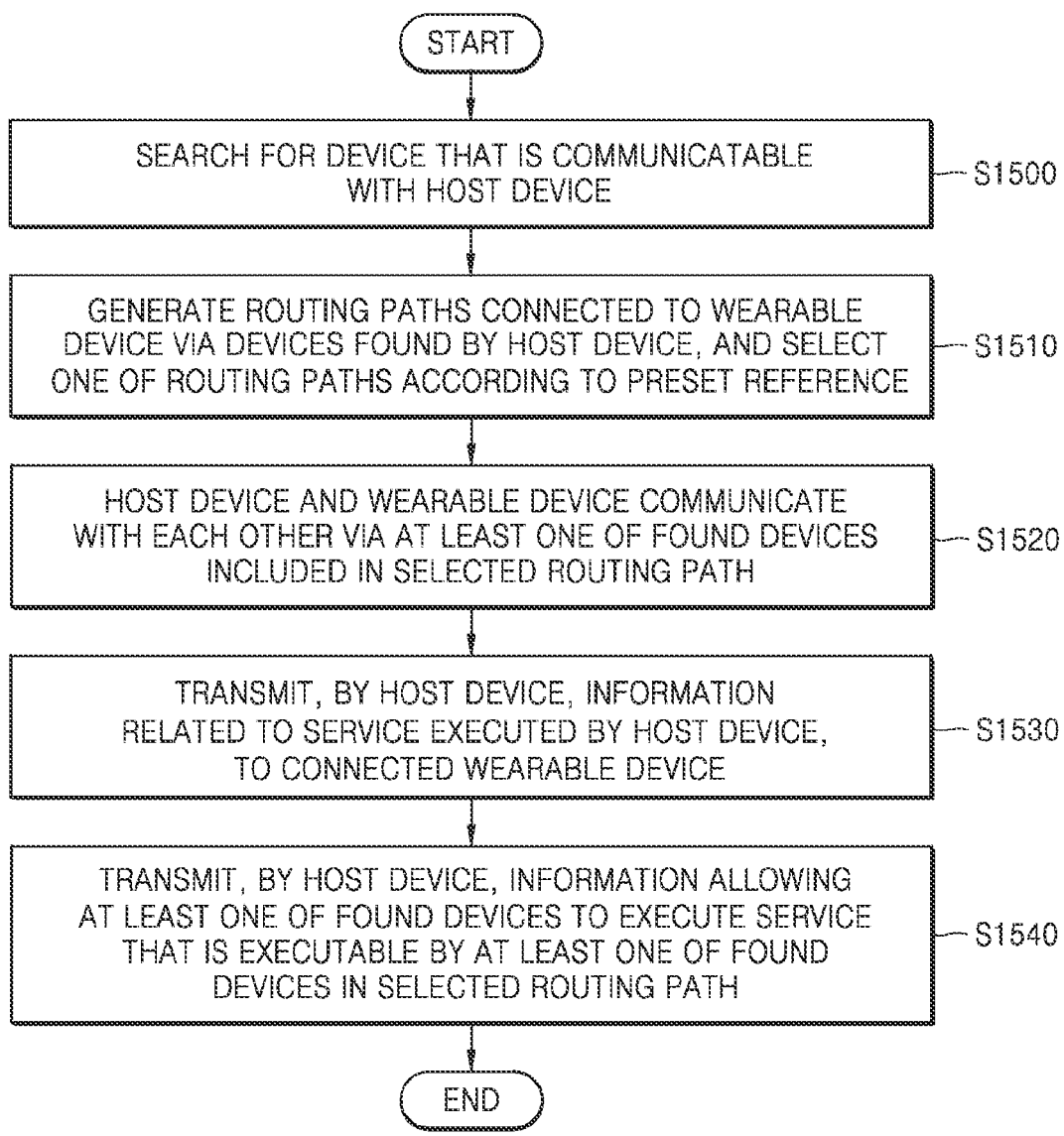

Referring to FIG. 15, in operation S1500 of FIG. 15, the host device 100 searches for a device 110 that is communicatable with the host device 100.

In operation S1510, the host device 100 generates routing paths that are connected to the wearable device 120 via devices 110 found by the host device 100, and selects one of the routing paths according to a preset reference.

In operation S1520, the host device 100 and the wearable device 120 communicate with each other via at least one of the found devices 110 included in the selected routing path.

In operation S1530, the host device 100 transmits, to the wearable device 120, information related to a service that is executed by the host device 100.

In operation S1540, the host device 100 transmits, to at least one of the found devices 110, information allowing at least one of the found devices 110 to execute a service that is executable by at least one of the found devices 110 included in the selected routing path.

Figure 16:
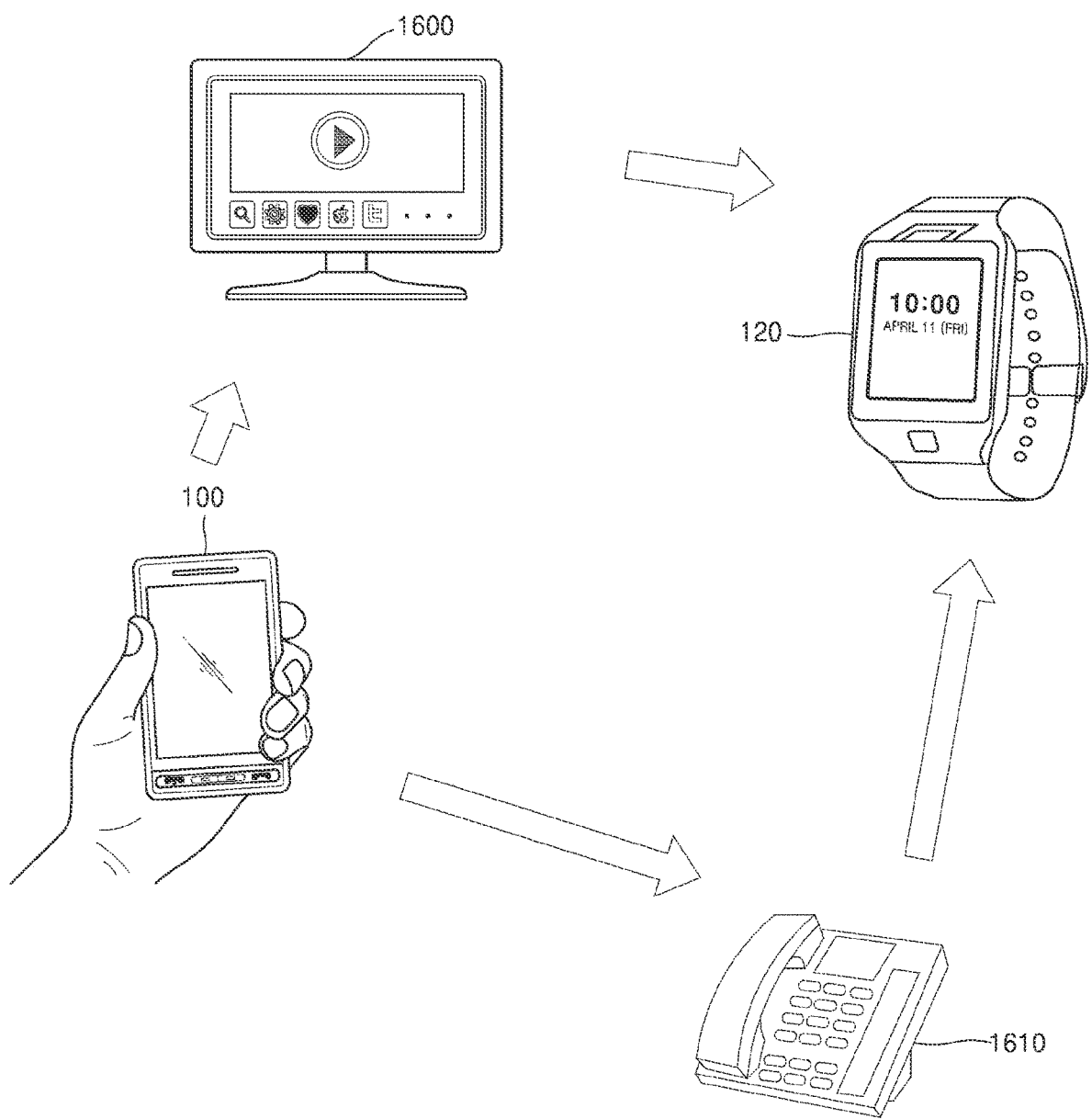
FIG. 16 illustrates an example of communication among a plurality of devices according to an embodiment of the present disclosure.

FIG. 16 illustrates an example of communication among a plurality of devices according to an embodiment of the present disclosure.

Referring to FIG. 16, the host device 100 searches for a device that is communicatable with the host device 100. Found devices include a smart TV 1600 and a telephone 1610. The host device 100 sets a routing path according to a preset reference so as to communicate with the wearable device 120 via at least one of the smart TV 1600 and the telephone 1610. The host device 100 may set the routing path according to a type of a service to be executed by the host device 100 and a type of the found devices. For example, in a case where the service to be executed by the host device 100 is a video call, and the telephone 1610 is included in the found devices, the host device 100 may be set to be connected to the wearable device 120 via the telephone 1610. As another example, in a case where the service to be executed by the host device 100 is a video call, and the smart TV 1600 and the telephone 1610 are included in the found devices, the host device 100 may be set to communicate with the wearable device 120 via the smart TV 1600 and then via the telephone 1610. The host device 100 may previously be set so as to communicate with the wearable device 120 via a device having a highest security level from among the found devices. The reference with respect to setting the routing path may be randomly changed according to user's setting or may be differently set according to users. For example, the host device 100 may change access authority according to users and thus may differently set the reference according to the users. Alternatively, the host device 100 may differently set the reference according to users' preference for a path. The host device 100 may differently set the reference according to access locations of a user. For example, a routing path setting reference of when the user uses the host device 100 in a living room may be different from a routing path setting reference of when the user uses the host device 100 in a bathroom.

As another example, the reference may be set in such a manner that the host device 100 may communicate with the wearable device 120 via a lighting apparatus after a preset time (e.g., after 11:00 p.m.). As another example, the reference may be set in such a manner that, when a room temperature is equal to or greater than a preset temperature (e.g., at least 30 degrees), the host device 100 may communicate with the wearable device 120 via a cooling apparatus. The host device 100 may set the reference so as to communicate with the wearable device 120 via devices related to a user's schedule. For example, if the user's schedule stored in the host device 100 includes a schedule of downloading a particular moving picture at 4:00 p.m., the host device 100 may set the reference so as to communicate with the wearable device 120 via a video device. The host device 100 communicates with the wearable device 120 via at least one of the found devices included in the routing path. The host device 100 may transmit, to the wearable device 120, information related to a service executed by the host device 100. The host device 100 may set the reference so as to communicate with the wearable device 120 via a smart TV from among the smart TV to which a power is constantly supplied and a smartphone that uses a battery, in consideration of a battery capacity of the found device 110. The host device 100 may analyze information about a drama that the user often watches, and if the smart TV 1600 starts broadcasting the drama, the host device 100 may communicate with the wearable device 120 via the smart TV 1600, instead of using a path where the host device 100 communicated with the wearable device 120 via the telephone 1610. If the wearable device 120 requests the host device 100 for data so as to receive time information, the host device 100 may communicate with the wearable device 120 via the smartphone, instead of using a path where the host device 100 communicated with the wearable device 120 via the smart TV 1600. It is because time information provided by the smartphone is more accurate than time information provided by the smart TV 1600.

Figure 17:
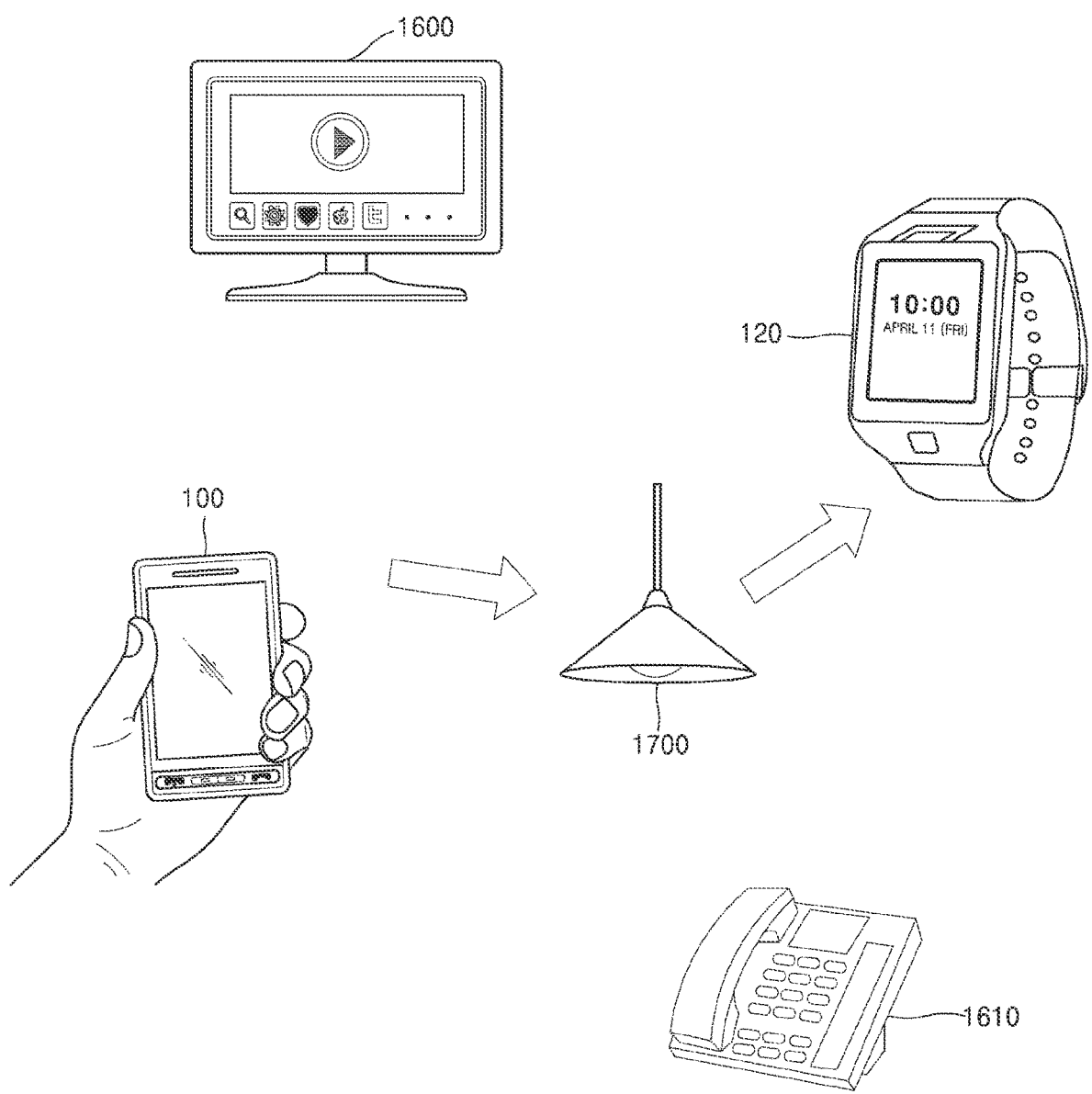
FIG. 17 illustrates an example of communication among a plurality of devices according to an embodiment of the present disclosure.

FIG. 17 illustrates an example of communication among a plurality of devices according to an embodiment of the present disclosure.

Referring to FIG. 17, the host device 100 searches for devices that are communicatable with the host device 100. Found devices include a smart TV 1600, a telephone 1610, and a lighting apparatus 1700. The host device 100 sets a routing path according to a preset reference so as to communicate with the wearable device 120 via at least one of the smart TV 1600, the telephone 1610, and the lighting apparatus 1700. The host device 100 may set the routing path according to a type of a service to be executed by the host device 100 and a type of the found devices. The reference may be set in such a manner that the host device 100 may communicate with the wearable device 120 via the lighting apparatus 1700 after a preset time (e.g., after 11:00 p.m.). The host device 100 may turn on the lighting apparatus 1700 in the set routing path.

Figure 18:
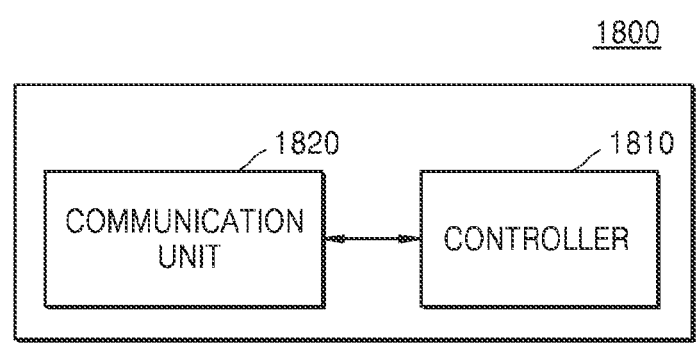

A device 1800 shown in FIGS. 18 and 19 may correspond to the host device 100 of a system in which a plurality of devices communicate with each other, described above with reference to FIGS. 1 to 17.

FIGS. 18 and 19 are block diagrams illustrating devices for communicating among a plurality of devices according to various embodiments of the present disclosure.

Referring to FIG. 18, the device 1800 according to some embodiments may include a controller 1810 (also referred to as the processor 1810) and a communication unit 1820.

The controller 1810 may search for devices 110 that are communicatable with the host device 100. The controller 1810 may generate routing paths connected to the wearable device 120 via devices 110 found by the host device 100. The controller 1810 may select one of the routing paths according to a preset reference. An example of the preset reference may include a reference for differently setting the routing paths according to services executed by the host device 100. Another example of the preset reference may include a reference for differently setting the routing paths according to security levels of the found devices 110. Other examples of the preset reference may include a reference for differently setting the routing paths according to locations of the host device 100, a reference for differently setting the routing paths according to access authorities with respect to the found devices 110, or the like. The controller 1810 may group the found devices 110 according to a preset grouping reference. The controller 1810 may generate routing paths connected to the wearable device 120 via devices 110 grouped by the host device 100, and may select one of the routing paths according to a preset reference. The controller 1810 may search for the devices 110 according to a communication history between the host device 100 and the devices 110 or according to a device list received from a home server.

The communication unit 1820 of the host device 100 may transmit information to the wearable device 120 via at least one of the grouped devices 110 included in the selected routing path. The communication unit 1820 may transmit information to at least one of the grouped devices 110 included in the selected routing path. The communication unit 1820 may transmit, to the wearable device 120, information related to a service executed by the host device 100. The communication unit 1820 may transmit information related to a service executed by the host device 100 to at least one of the grouped devices 110 included in the selected routing path. The communication unit 1820 may transmit, to at least one of the grouped devices 110, information allowing at least one of the grouped devices 110 to execute a service that is executable by at least one of the grouped devices 110 included in the selected routing path.

Not all elements shown in FIG. 18 are necessary elements. That is, the host device 100 may be embodied with more or less elements than the elements shown in FIG. 18. For example, referring to FIG. 19, the device 1800 according to some embodiments may include a user input unit 1830, an output unit 1840, the controller 1810, the communication unit 1820, a sensing unit 1850, an audio/video (A/V) input unit 1860, and a memory 1870.

The user input unit 1830 may be a unit by which a user inputs data so as to control the device 1800. For example, the user input unit 1830 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, but one or more embodiments are not limited thereto.

For example, the user input unit 1830 may receive user information (e.g., account information of a user). The user input unit 1830 may receive a user input of selecting one of a plurality of devices. The user input unit 1830 may receive a user input of requesting to generate an encryption key or a decryption key.

The user input unit 1830 may receive a user input of requesting to store contents. The user input unit 1830 may receive a user input of requesting to execute a program. The user input unit 1830 may receive a user input of requesting to end a program. The user input unit 1830 may receive a user input of selecting encrypted contents.

The output unit 1840 may output an audio signal, a video signal, or a vibration signal and may include a display unit 1841, a sound output unit 1842, a vibration motor 1843, or the like.

The display unit 1841 displays and outputs information that is processed in the device 1800. For example, the display unit 1841 may display a user interface for selecting a virtual image, a user interface for setting an operation of a virtual image, a user interface for purchasing an item of a virtual image, or the like.

When the display unit 1841 and a touch pad form a mutual layer structure and then are formed as a touch screen, the display unit 1841 may be used as both an output device and input device. The display unit 1841 may include at least one of a liquid crystal display (LCD), a thin film transistor-LCD (TFT-LCD), an organic light-emitting diode (OLED) display, a flexible display, a three-dimensional (3D) display, and an electrophoretic display. According to a type of the device 1800, the device 1800 may include at least two display units 1841. The at least two display units 1841 may be disposed to face each other by using a hinge.

The sound output unit 1842 may output audio data that is received from the communication unit 1820 or is stored in the memory 1870. The sound output unit 1842 may also output a sound signal (e.g., a call signal receiving sound, a message receiving sound, a notifying sound, or the like) related to capabilities performed by the device 1800. The sound output unit 1842 may include a speaker, a buzzer, or the like.

The vibration motor 1843 may output a vibration signal. For example, the vibration motor 1843 may output the vibration signal that corresponds to an output of the audio data (e.g., the call signal receiving sound, the message receiving sound, or the like) or video data. Also, when a touch is input to the touch screen, the vibration motor 1843 may output a vibration signal.

The controller 1810 may generally control all operations of the device 1800. That is, the device 1800 may control the user input unit 1830, the output unit 1840, the sensing unit 1850, the communication unit 1820, the AN input unit 1860, etc. by executing programs stored in the memory 1870.

For example, the controller 1810 may search for at least one device that is communicatable with the host device 100. The controller 1810 may set a routing path according to a preset reference so as to allow the host device 100 to communicate with the wearable device 120 via at least one of found devices.

The controller 1810 may group the found devices according to a preset grouping reference. The controller 1810 may set a routing path according to a preset reference so as to allow the host device 100 to communicate with the wearable device 120 via at least one of the grouped devices.

The controller 1810 may search for the at least one device according to a communication history between the host device 100 and the at least one device or according to a device list received from a home server.

The sensing unit 1850 may sense a state of the device 1800 or a status around the device 1800 and may transfer sensed information to the controller 1810.

The sensing unit 1850 may include at least one selected from a magnetic sensor 1851, an acceleration sensor 1852, a temperature/humidity sensor 1853, an infrared sensor 1854, a gyroscope sensor 1855, a positioning sensor (e.g., global positioning system (GPS)) 1856, an air pressure sensor 1857, a proximity sensor 1858 and an red, green, blue (RGB) sensor (i.e., a luminance sensor) 1859, but one or more various embodiments are not limited thereto. Functions of the sensors may be intuitionally deduced by one of ordinary skill in the art by referring to names of the sensors, and thus, detailed descriptions thereof are omitted here.

The communication unit 1820 may include one or more elements allowing data communication between the device 1800 and another device or between the device 1800 and a server. For example, the communication unit 1820 may include a short-range wireless communication unit 1821, a mobile communication unit 1822, and a broadcast receiving unit 1823.

The short-range wireless communication unit 1821 may include, but is not limited to, a Bluetooth communication unit, a Bluetooth low energy (BLE) communication unit, a near field communication (NFC) unit, a wireless local area network (WLAN) communication unit, a ZigBee communication unit, an infrared data association (IrDA) communication unit, a Wi-Fi direct (WFD) communication unit, an ultra wide band (UWB) communication unit, or an Ant+ communication unit.

The mobile communication unit 1822 exchanges a wireless signal with at least one of a base station, an external terminal, and a server on a mobile communication network. The wireless signal may include various types of data according to communication of a sound call signal, a moving picture call signal, or a text/multimedia message.

The broadcast receiving unit 1823 receives a broadcast signal and/or information related to a broadcast from the outside through a broadcast channel. The broadcast channel may include a satellite channel and a ground wave channel. In some embodiments, the device 1800 may not include the broadcast receiving unit 1823.

The communication unit 1820 of the host device 100 may communicate with the wearable device 120 via at a device included in a pre-selected routing path. The communication unit 1820 may transmit, to the wearable device 120, information related to a service executed by the host device 100. The communication unit 1820 may transmit information for allowing the device to execute a service that is executable by the device included in the pre-selected routing path.

The A/V input unit 1860 may receive an input of an audio signal or a video signal and may include a camera 1861 and a microphone 1862. The camera 1861 may obtain an image frame such as a still image or a moving picture via an image sensor during a moving picture call mode or an image-capturing mode. An image that is captured via the image sensor may be processed by the controller 1810 or a separate image processor (not shown).

The image frame that is processed by the camera 1861 may be stored in the memory 1870 or may be transmitted to an external source via the communication unit 1820. According to a configuration of the device 1800, two or more cameras 1861 may be arranged.

The microphone 1862 receives an external sound signal as an input, and processes the received sound signal to electrical voice data. For example, the microphone 1862 may receive a sound signal from an external device or a speaker. In order to remove noise that occurs while the sound signal is externally input, the microphone 1862 may use various noise removing algorithms.

The memory 1870 may store a program for processing and controlling the controller 1810, or may store a plurality of pieces of data input to or output from the device 1800.

The memory 1870 may include a storage medium of at least one type of a flash memory, a hard disk, a multimedia card type memory, a card type memory such as an secure digital (SD) or an extreme digital (XD) card memory, a random access memory (RAM), a static RAM (SRAM), a read-only memory (ROM), an electrically erasable programmable ROM (EEPROM), a programmable ROM (PROM), a magnetic memory, a magnetic disc, and an optical disc.

The programs stored in the memory 1870 may be classified into a plurality of modules according to their functions, for example, into a user interface (UI) module 1871, a touchscreen module 1872, an alarm module 1873, etc.

The UI module 1871 may provide a specialized UI or graphical user interface (GUI) in connection with the device 1800 for each application. The touchscreen module 1872 may detect a user's touch gesture on the touch screen and transmit information related to the touch gesture to the controller 1810. The touchscreen module 1872 according to some embodiments may recognize and analyze a touch code. The touchscreen module 1872 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The alarm module 1873 may generate a signal for notifying the user about an occurrence of an event in the device 1800. Examples of the event that may occur in the device 1800 include a call signal receiving event, a message receiving event, a key signal input event, a schedule notifying event, or the like. The alarm module 1873 may output an alarm signal in the form of a video signal via the display unit 1841, an alarm signal in the form of an audio signal via the sound output unit 1842, or an alarm signal in the form of a vibration signal via the vibration motor 1843.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a host device for communicating with a plurality of devices, the method comprising:
    searching for devices that are communicatable with each other or the host device;
    generating routing paths for data transmission to connect the host device to a client device via the devices searched by the host device;
    selecting one of the routing paths according to a preset reference;
    communicating with the client device via at least one of the searched devices included in the selected routing path; and
    transmitting, to the client device, information related to a service executed by the host device,
    wherein the transmitting comprises transmitting information for allowing the client device to execute a service that is executable by the at least one of the searched devices in the selected routing path, and wherein the preset reference comprises:
  a first reference that is set according to a service executed by the host device, or
  a second reference that is set according to a security level of each of the searched devices.

2. The method of claim 1,
wherein the selecting comprises:
  generating routing paths connected to the client device via the searched devices, and
  selecting one of the routing paths according to the preset reference, and wherein a preset grouping reference comprises at least one of:
    a grouping reference according to services to be executed by the host device,
    a grouping reference according to distances between the host device and the searched devices, or
    a grouping reference according to users of the searched devices.

3. The method of claim 1, wherein the searching comprises searching for the devices according to a communication history between the host device and the devices.

4. The method of claim 1, wherein the searching comprises searching for the devices according to a device list received from a home server.

5. The method of claim 1, wherein the preset reference comprises a third reference that is set according to a location of the host device.

6. The method of claim 1, wherein the preset reference comprises a fourth reference that is set according to access authorities with respect to the searched devices.

7. A non-transitory computer-readable recording medium having recorded thereon a program for executing by a computer the method of claim 1.

8. A host device configured to transmit information to at least one device comprised in a routing path, the host device comprising:
  at least one processor;
  a memory storing instructions executed by the at least one processor;
  the at least one processor configured to:
    search for devices that are communicable with each other or the host device;
    generate routing paths for data transmission to connect the host device to a client device via the devices searched by the host device, and
    select one of the routing paths according to a preset reference; and
  a communicator configured to transmit information to the client device via at least one of the searched devices included in the selected routing path,
wherein the preset reference comprises:
  a first reference that is set according to a service executed by the host device, or
  a second reference that is set according to a security level of each of the searched devices,
wherein the communicator is further configured to transmit, to the client device, information related to the service executed by the host device, and
wherein the communicator is further configured to transmit information for allowing the client device to execute a service that is executable by the at least one of the searched devices in the selected routing path.

9. The host device of claim 8,
wherein the at least one processor is further configured to:
  generate routing paths connected to the client device via the searched devices, and
  select one of the routing paths according to the preset reference, and wherein a preset grouping reference comprises at least one of:
    a grouping reference according to services to be executed by the host device,
    a grouping reference according to distances between the host device and the searched devices, or
    a grouping reference according to users of the searched devices.

10. The host device of claim 8, wherein the at least one processor is further configured to search for the devices according to a communication history between the host device and the devices.

11. The host device of claim 8, wherein the at least one processor is further configured to search for the devices according to a device list received from a home server.

12. The host device of claim 8, wherein the preset reference comprises a third reference that is set according to a location of the host device.

13. The host device of claim 8, wherein the preset reference comprises a fourth reference that is set according to access authorities with respect to the searched devices.

* * * * *